United States Patent [19]
Kim

[11] Patent Number: 6,102,682
[45] Date of Patent: Aug. 15, 2000

[54] SLIDABLE DISCHARGE VALVE IN A HERMETIC ROTARY COMPRESSOR

[75] Inventor: Seung-Il Kim, Kyungki-do, Rep. of Korea

[73] Assignee: Samsung Electronics Co., Ltd., Suwon, Rep. of Korea

[21] Appl. No.: 09/179,438

[22] Filed: Oct. 27, 1998

[30] Foreign Application Priority Data

Apr. 18, 1998 [KR] Rep. of Korea ............. 98-13930

[51] Int. Cl.[7] .................................................. F03C 2/00
[52] U.S. Cl. .......................... 418/63; 418/270; 137/528; 137/535
[58] Field of Search .............. 418/63, 270; 137/528, 137/535

[56] References Cited

U.S. PATENT DOCUMENTS

| 5,221,191 | 6/1993 | Leyderman et al. | 417/312 |
| 5,494,422 | 2/1996 | Ukai et al. | 418/55.1 |
| 5,605,447 | 2/1997 | Kim et al. | 417/312 |

FOREIGN PATENT DOCUMENTS

| 0043996 | 3/1984 | Japan | 418/63 |
| 0199995 | 9/1987 | Japan | 418/63 |
| 403067089 | 3/1991 | Japan | 418/63 |
| 404255594 | 9/1992 | Japan | 418/63 |

Primary Examiner—Thomas Denion
Assistant Examiner—Theresa Trieu
Attorney, Agent, or Firm—Burns, Doane, Swecker & Mathis, L.L.P.

[57] ABSTRACT

A compressor comprises a cylinder assembly forming a compression space. A compressing member is movable disposed in the compression space for compressing fluid therein. A discharge port communicates with the compression space for discharging compressed fluid. A valve is mounted on the cylinder assembly for sliding movement across the discharge port between a first position blocking the discharge port, and a second position unblocking the discharge port. A valve mover in the form of a plate spring is connected to the valve and communicates with pressure in the compression space. In response to a pressure build-up in the compression space, the plate spring is elastically deformed to slide the valve from the first position to the second position for unblocking the discharge port.

2 Claims, 6 Drawing Sheets

SLIDABLE DISCHARGE VALVE IN A HERMETIC ROTARY COMPRESSOR

BACKGROUND OF THE INVENTION

1. Field of the Invention

The present invention relates to a hermetic rotary compressor, and more particularly to a discharge valve for selectively opening/closing a discharge port through which the refrigerant is discharged.

2. Description of the Prior Art

Generally, a compressor, as shown in FIG. 1, has a sealed casing 10, a motor 20 installed inside the casing 10, and a cylinder assembly 30 for compressing the sucked refrigerant while rotating under a driving force transmitted from the motor 20.

The motor 20 has a stator 21, a rotor 22, and an eccentric shaft 23. The stator 21 is press-fitted to an inner peripheral surface of the casing 10, while the rotor 22 is rotatably installed inside the stator 21 at a predetermined radial spacing therefrom. The rotor 22 is fixed with the eccentric shaft 23.

A cylinder assembly 30 includes upper and lower flanges 31 and 32 for supporting the eccentric shaft 23, a cylinder 33 installed between the upper and the lower flanges 31 and 32, and a rotor 34 mounted on the eccentric shaft 23. An inner peripheral surface of the cylinder 33 defines a compression space. The rotor 34 revolves within the compression space in accordance with the movement of the eccentric shaft 23.

A discharge port 31a is formed in the upper flange 31 so as to discharge the refrigerant which is compressed in the compression space of the cylinder 33 to a discharge space 10a of the casing 10. Additionally, a discharge valve 40 is installed at the upper flange 31. The discharge valve 40 opens the discharge port 31a under the pressure of the compression space.

As shown in FIG. 2, the discharge valve 40 has a valve member 41 and a valve backer 42. The valve member 41 is pivotably fixed to a side of the upper flange 31. The valve backer 42 limits the upward stroke of the valve member 41.

In the conventional hermetic rotary compressor, as the rotational force from the motor 20 is transmitted to the rotor 34, the rotor 34 revolves within the inner space of the cylinder 33, i.e., the compression space. Accordingly, the refrigerant is compressed in the compression space, and discharged to the discharge space 10a through the discharge port 31a and a muffler 36. The discharged refrigerant is, then, introduced to the other devices installed outside of the casing 10 such as a condenser (not shown), etc.

However, such a discharge valve 40 of a conventional compressor has drawbacks in that when the valve member 41 opens or closes so as to permit the compressed refrigerant to pass, the valve member 41 beats against valve backer 42 and the upper flange 31, which is the main cause of the noise of the compressor.

SUMMARY OF THE INVENTION

The present invention has been made to overcome above mentioned problem, and accordingly, it is an object of the present invention to provide a discharge valve of a hermetic rotary compressor for reducing the noise which is generated during the opening/closing of the discharge port.

To accomplish the above mentioned objects, the present invention relates to a compressor which comprises a cylinder assembly forming a compression space. A compressing member is movably disposed in the compression space for compressing fluid therein. A discharge port is formed in the cylinder assembly and communicates with the compression space for discharging compressed fluid. The discharge port extends through a surface of the cylinder assembly. A valve is mounted on the cylinder assembly for sliding movement along the surface between a first position blocking the discharge port, and a second position unblocking the discharge port. A valve mover communicates with fluid pressure in the compression space and is connected to the valve for moving the valve to the second position in response to a pressure build-up in the compression space. A guide is provided for guiding the sliding movement of the valve.

Preferably, the valve is movable between first and second positions which are the valve closing and opening positions, respectively, by a plate spring which is elastically deformable in response to a pressure build-up in the compression space.

The cylinder assembly preferably includes a mover hole having a narrow neck, and first and second expanded sections located on opposite sides of the neck. The plate spring extends through the neck, whereby portions of the plate spring are disposed in the expanded sections to permit deformation of the plate spring. One end of the plate spring is connected to the valve, and an opposite end thereof is supported by a wall of the mover hole.

The valve preferably has an opening section formed therein, the opening section being aligned with the discharge port in the second position of the valve.

Eventually, the pressure of the compression space exceeds the pressure for refrigerant discharge, and that pressure is applied to the plate spring through the first expanded section of the mover hole. Accordingly, the plate spring is deformed in an opposite direction so as to move the valve member. Thus, an opening section of the valve member becomes aligned with the discharge port of the upper flange so that the discharge port is opened. After the discharge of the refrigerant, the plate spring is returned to its initial shape, and the valve member accordingly returns to the initial position so that the discharge port is closed.

According to the present invention, since the valve member opens/closes the discharge port while the valve member is sliding along the upper flange rather than banging against a stopper, no appreciable noise is generated. Accordingly, the noise of the compressor as a whole is reduced.

BRIEF DESCRIPTION OF THE DRAWINGS

The above object and advantages will be more apparent by describing preferred embodiment in greater detail with reference to the drawings accompanied, in which.

DETAILED DESCRIPTION OF THE PREFERRED EMBODIMENT

Figure 1:
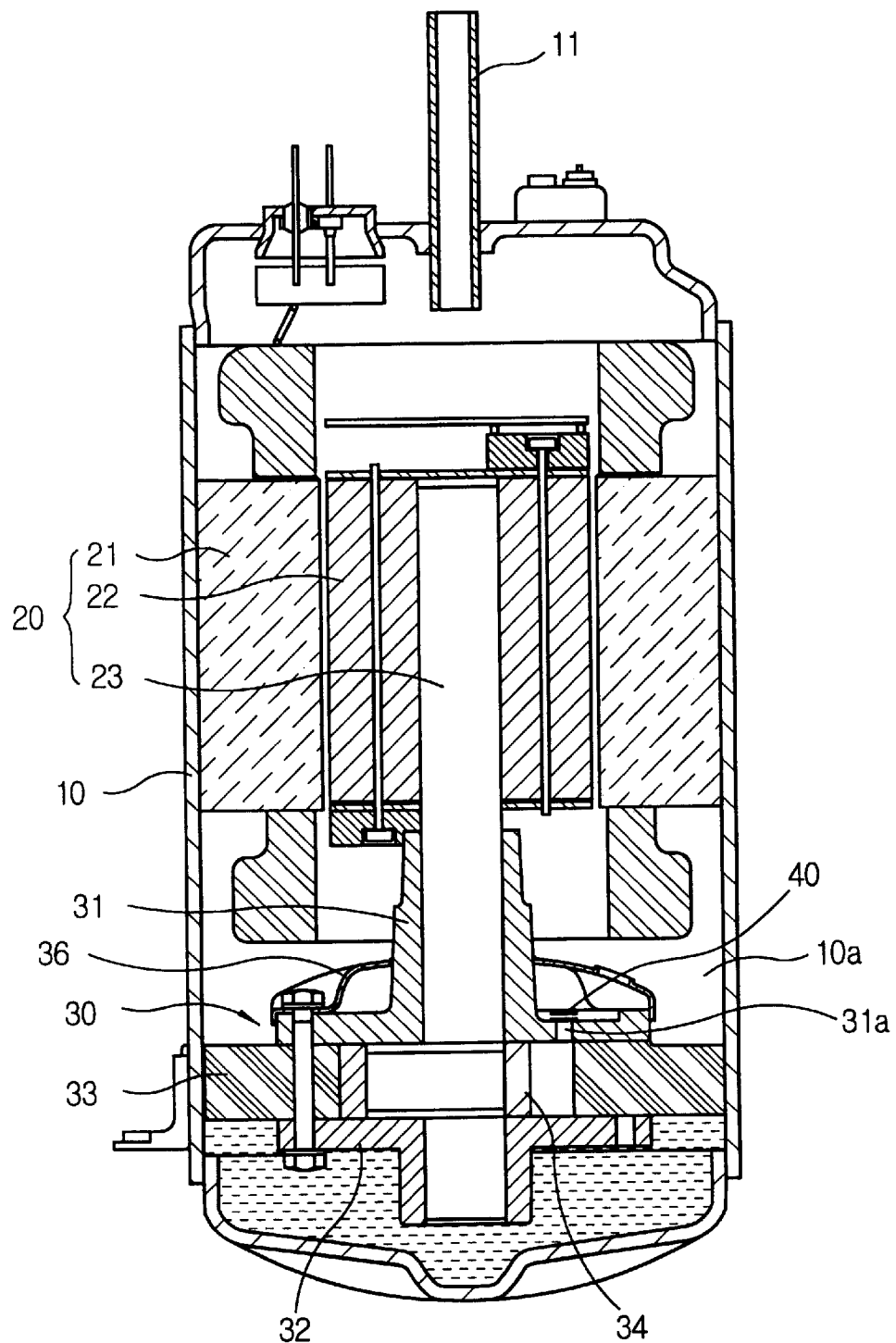
FIG. 1 is a cross sectional view showing a conventional hermetic rotary compressor.

FIGS. 3 to 6 show a preferred embodiment of a discharge valve according to the present invention.

As shown in the drawings, the discharge valve includes a valve member 51, a mover, and a guide 53. The valve member 51 is slidably disposed along the upper flange 31. The mover reciprocally moves the valve member 51 in accordance with the pressure of the compression space 33a. The guide 53 guides the valve member 51.

The valve member 51 has a valve-opening section in the form of a hole 51a for communicating the discharge port 31a with a discharge space 10a, and a solid closing section 51b for closing the discharge port 31a. Preferably, the opening section 51a has the same diameter as the discharge port 31a, although that is not mandatory.

The mover comprises a plate spring mounted in a mover hole 37. A first portion of the mover hole 37 is formed in the upper flange 31, and a second portion of the mover hole 37 is formed in the cylinder 33. The mover hole 37 communicates with the compression space 33a of the cylinder 33. The plate spring 52 is disposed within the mover hole 37 so as to elastically bias the valve member 51 to a closed state.

Figure 3:
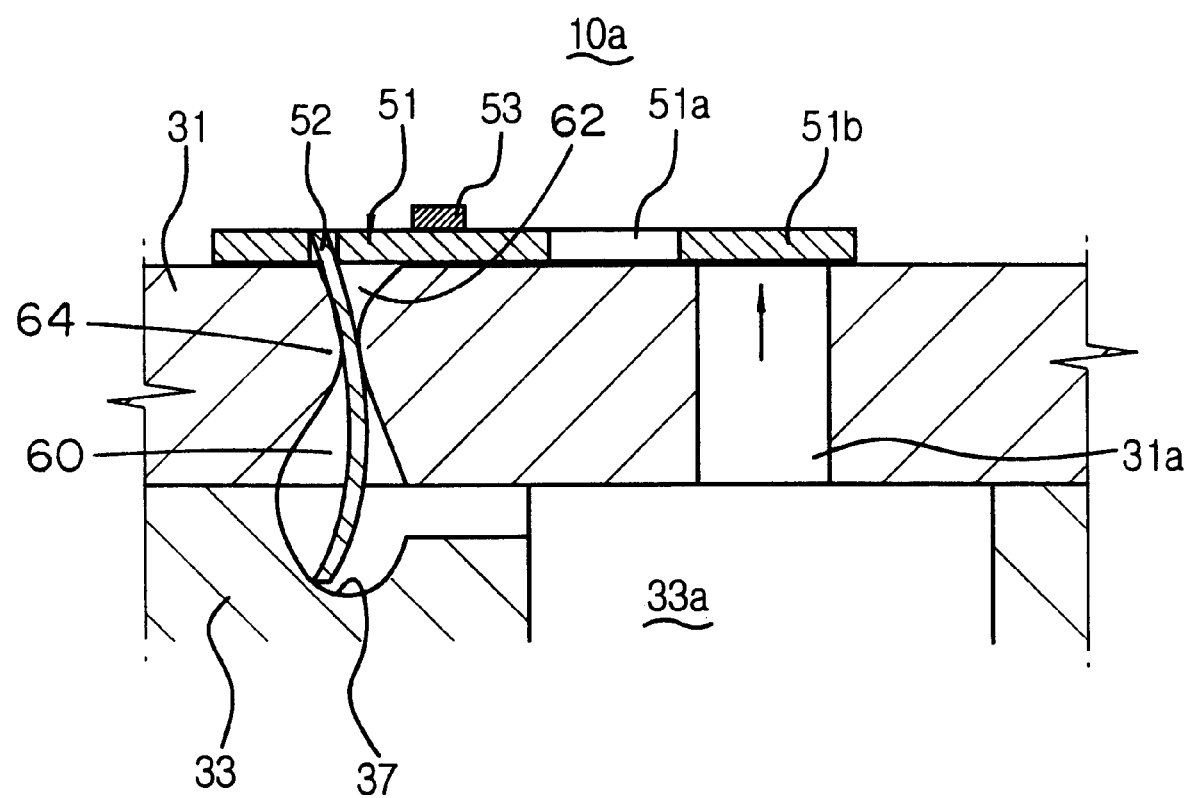
FIG. 3 is a cross sectional view showing a discharge valve according to the preferred embodiment of the present invention which is in a closed state.
Figure 5:
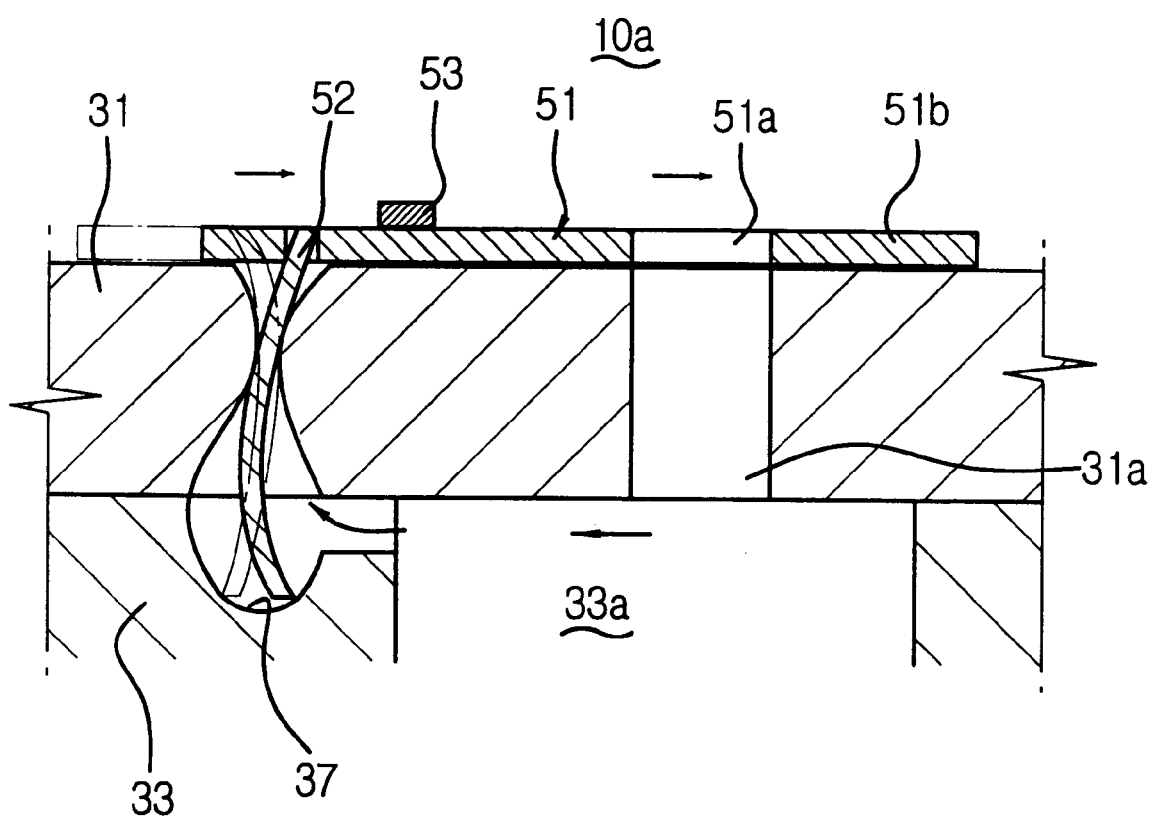
FIG. 5 is a cross sectional view showing a discharge valve according to the preferred embodiment of the present invention which is in an open state.

The mover hole 37 has a first expansion section 60 formed at a lower side of the mover hole 37 to communicate with the compression space 33a, a second expansion section 62 formed at a upper side thereof, and a neck section 64 between the first and the second expansion sections 60 and 62. The plate spring 52 passes through the neck section 64 of the mover hole 37. One end of the plate spring 52 is connected with the valve member 51, while the other end thereof is supported by the bottom of the mover hole 37. Normally, the plate spring 52 assumes a position in which it elastically biases the valve member 51 to a closed state (FIG. 3). And as the pressure of the compression space 33a becomes higher, the plate spring 52 is elastically deformed toward an opposite direction so as to move the valve member 51 to an open state (FIG. 5).

Additionally, the guide 53 is disposed on the upper flange 31 so as to guide the reciprocal movement of the valve member 51. The guide 53 prevents a deviation of the valve member 51 from the upper flange 31, or a moving of the valve member 51 in a width's direction (i.e., perpendicular to the paper in FIG. 5).

The operation of the discharge valve according to the preferred embodiment of the present invention is described hereinbelow.

Figure 4:
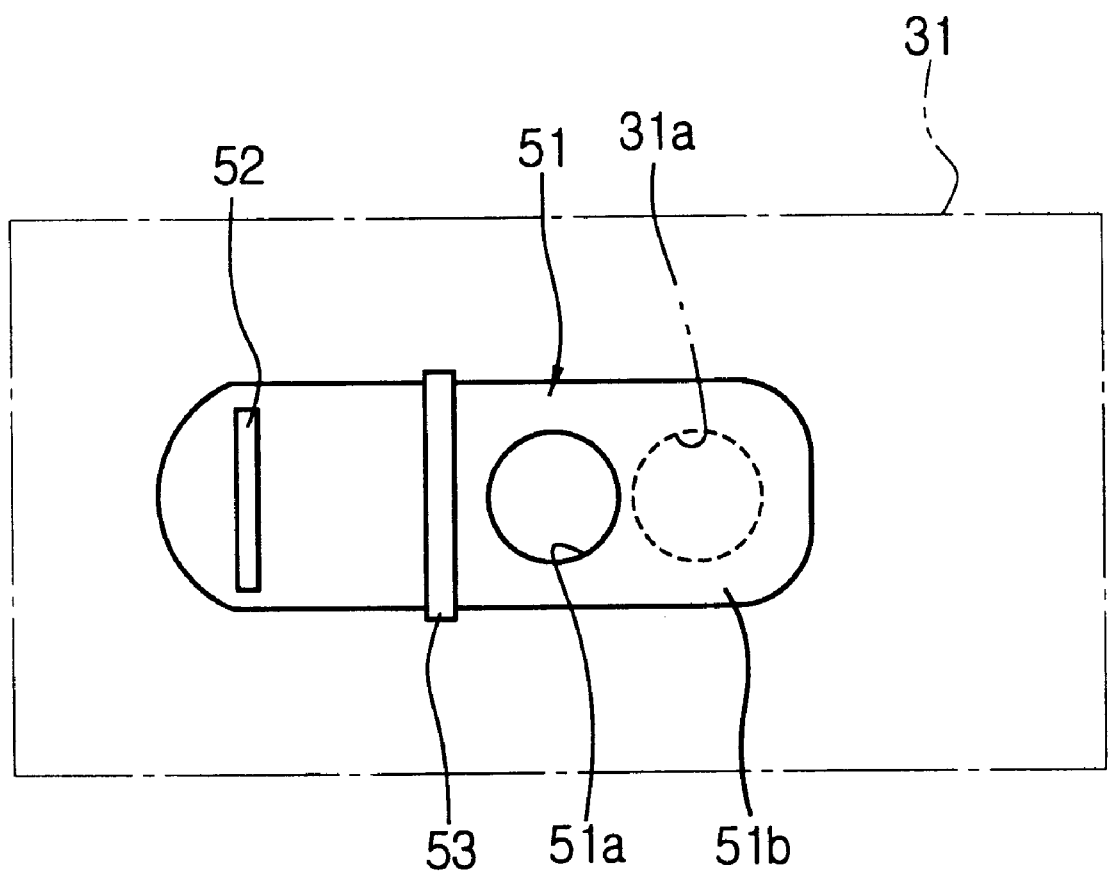
FIG. 4 is a plan view of FIG. 3.

First, during the compressing operation, the pressure of the inner compression space 33a of the cylinder 33 is lower than the pressure for refrigerant discharge. Such a situation is shown in FIGS. 3 and 4. In such situations, the plate spring 52 within the mover hole 37 keeps its regular shape, and the opening section 51a of the valve member 51 is offset from the discharge port 31a. Also, the discharge port 31a is blocked by the closing section 51b. Accordingly, the refrigerant in the compression space 33a is not discharged through the discharge port 31a.

Figure 6:
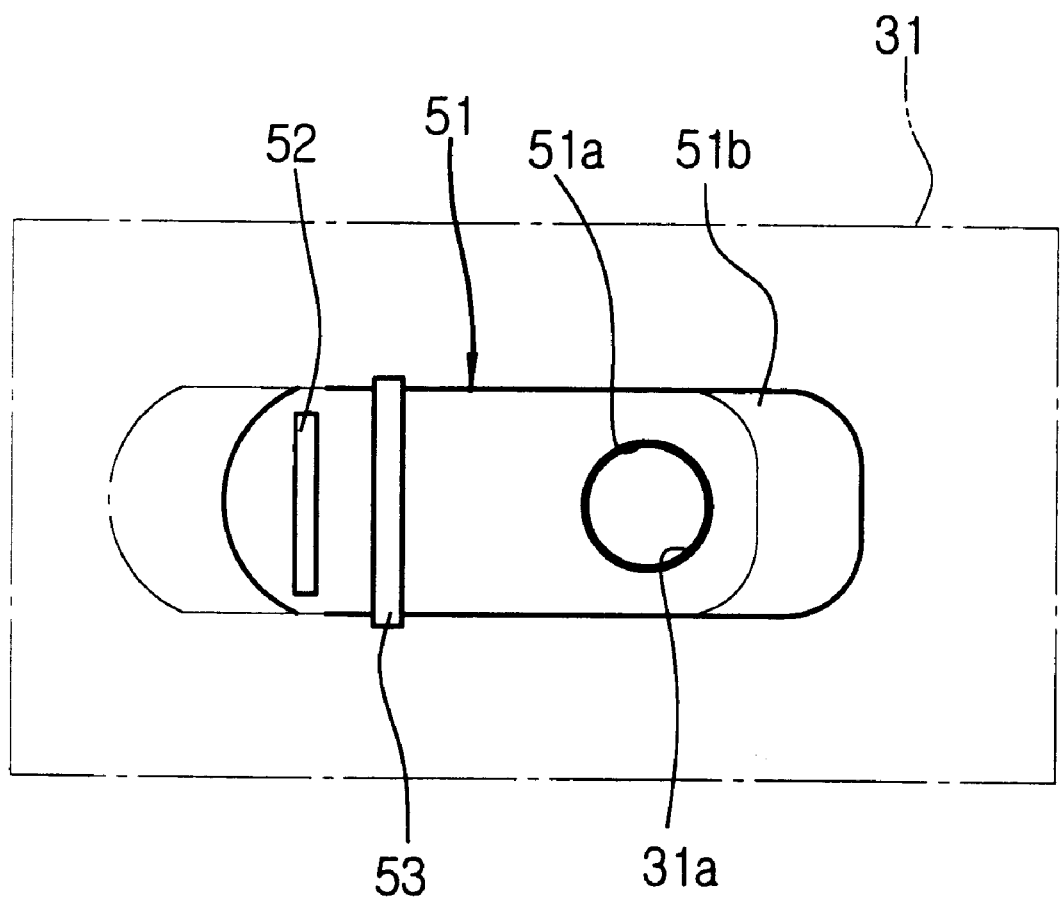
FIG. 6 is a plan view of FIG. 5.

With continuing compressing operation, the pressure of the compression space 33a eventually exceeds the pressure for refrigerant discharge, and the plate spring 52 disposed within the mover hole 37 is deformed. Accordingly, the valve member 51 connected to the one end of the plate spring 52 is slid along the upper surface of the upper flange 31. By the sliding of the valve member 51, the opening section 51a of the valve member 51 becomes aligned with the discharge port 31a, so that the discharge port is opened. By the opening of the valve, the refrigerant in the compression space 33a is discharged through the discharge port 31a. Such a situation is shown in FIGS. 5 and 6.

After the discharge of the refrigerant, the pressure of the compression space 33a becomes below the pressure for refrigerant discharge. Accordingly, the plate spring 52 disposed within the mover hole 37 recovers its original shape so that, as shown in FIGS. 3 and 4, the valve member 51 connected to the one end of the plate spring 52 is also returned to the initial position, and the valve is closed.

Figure 2:
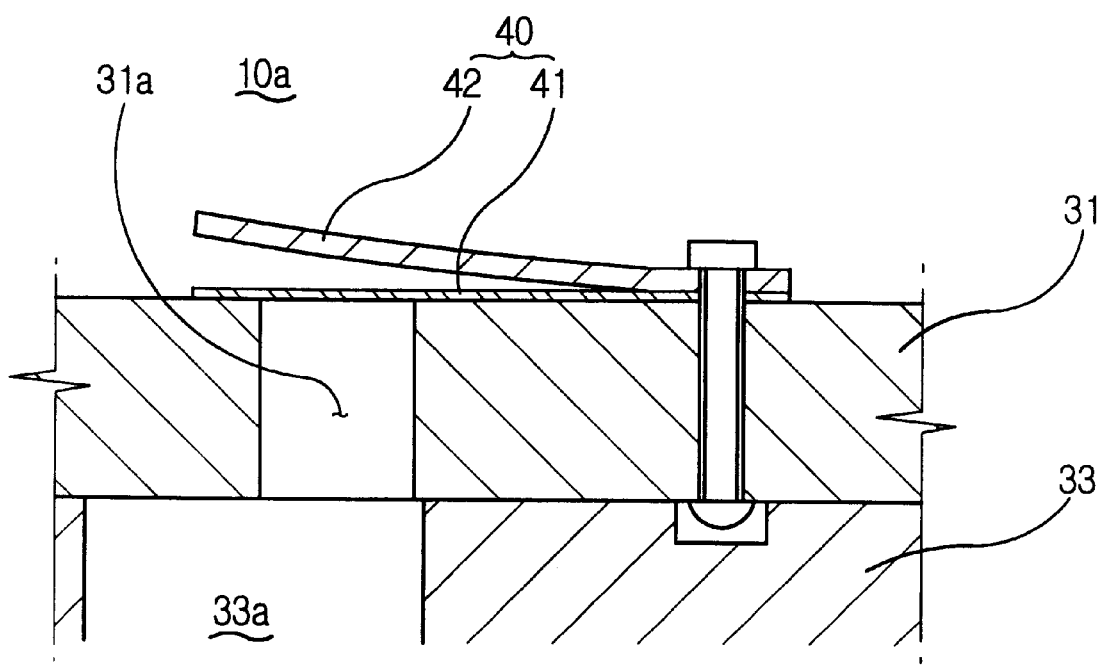
FIG. 2 is a cross sectional view illustrating a discharge valve of the conventional hermetic rotary compressor.

As described, according to the present invention, since the valve member is slid along the upper flange so as to open/close the discharge port, the noise generated during the opening/closing of the valve is much reduced as compared to that of FIG. 2. Accordingly, the noise of the compressor as a whole is also reduced.

While the present invention has been particularly shown and described with reference to a preferred embodiment thereof, it will be understood by those skilled in the art that various changes in form and detail may be effected therein without departing from the spirit and scope of the invention as defined by the appended claims.

What is claimed is:

1. A compressor comprising:

a cylinder assembly forming a compression space;

a compressing member movably disposed in the compression space for compressing fluid therein;

a discharge port formed in the cylinder assembly and communicating with the compression space for discharging compressed fluid, the discharge port extending through a surface of the cylinder assembly;

a valve mounted on the cylinder assembly for sliding movement along the surface between a first position blocking the discharge port, and a second position unblocking the discharge port;

a valve mover communicating with fluid pressure in the compression space, and being connected to the valve for moving the valve to the second position in response to a pressure build-up in the compression space; and a guide for guiding the sliding movement of the valves;

wherein the valve mover comprises a plate spring normally disposed in a configuration for positioning the valve in the first position, the plate spring being elastically deformable in response to a pressure build-up in the compression space for moving the valve to the second position;

wherein the cylinder assembly includes a mover hole having a narrow neck, and first and second expanded sections located on opposite sides of the neck, the plate spring extending through the neck whereby portions of the plate spring are disposed in the expanded sections to permit deformation of the plate spring one end of the plate spring connected to the valve, and an opposite end thereof supported by a wall of the mover hole.

2. The compressor according to claim 1 wherein the valve has an opening section formed therein, the opening section being aligned with the discharge port in the second position of the valve.

* * * * *